United States Patent [19]

Harris

[11] 3,896,939

[45] July 29, 1975

[54] TRANSFER MECHANISM

[76] Inventor: William O. Harris, 414 Bristol Dr., Harrisburg, Pa. 17109

[22] Filed: Apr. 24, 1974

[21] Appl. No.: 463,437

[52] U.S. Cl. .......... 214/1 BH; 214/1 BC; 214/147 T
[51] Int. Cl.² .......................................... B65G 29/00
[58] Field of Search .. 214/1 BC, 1 BH, 1 BD, 1 BV, 214/147 T

[56] References Cited
UNITED STATES PATENTS 3,422,966   1/1969   Iansons ............................ 214/1 BC
3,550,789   12/1970   Jaeger .............................. 214/1 BC Primary Examiner—Robert J. Spar
Assistant Examiner—George F. Abraham
Attorney, Agent, or Firm—Thomas Hooker

[57] ABSTRACT

A work piece transfer mechanism which moves a work piece without rotation along a segment of a cusped cycloidal-like curve generated on a surface, for instance, the surface of a sphere. The work piece pick up and discharge positions are preferably located at cusps on the curve.

8 Claims, 9 Drawing Figures

PATENTED JUL 29 1975          3,896,939

SHEET   1

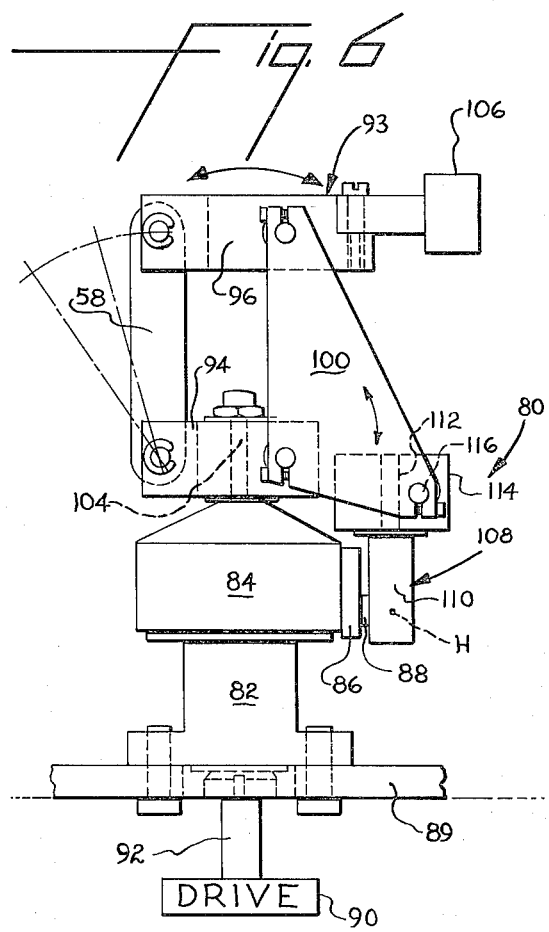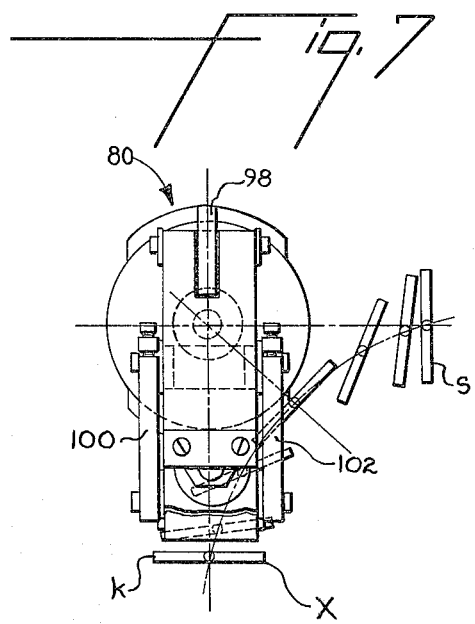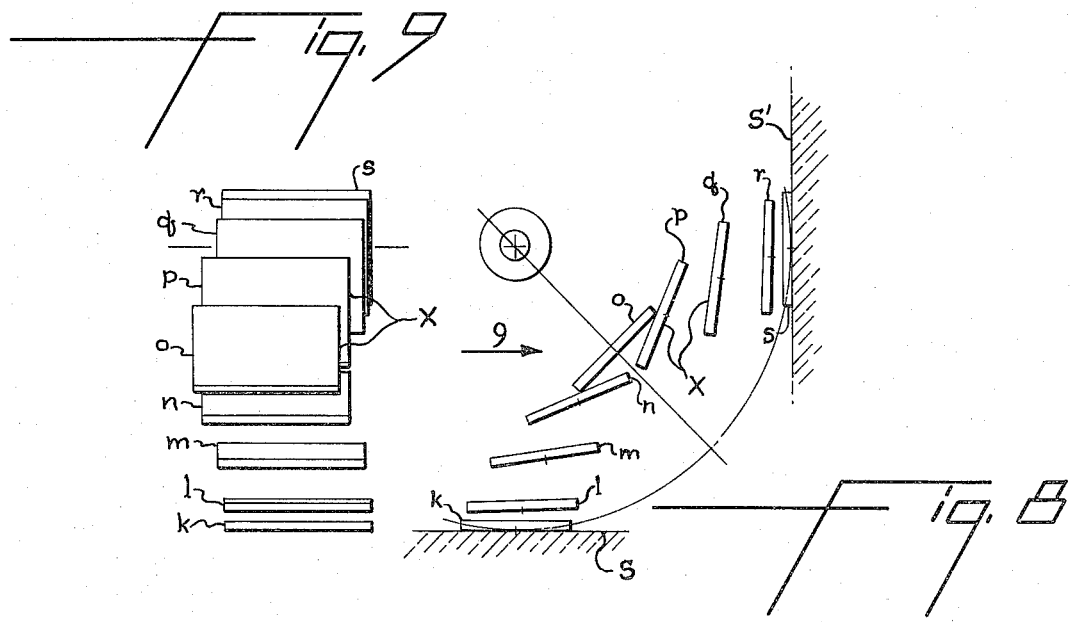

3,896,939

TRANSFER MECHANISM

The invention relates to transfer mechanisms for moving articles or work pieces between two positions. Frequently, such devices are used to move a work piece from a pick up position to a work position where a manufacturing operation is performed on the work piece. Devices of this type have become increasingly popular for transferring work pieces to a work station where potentially dangerous manufacturing operations are preformed. Such transfer mechanisms eliminate the need for manual feed of work pieces to the work position, thus lessening the chance of injury to the operator.

In the first embodiment of the transfer mechanism, the work piece is moved along a segment of a cycloidal-like curve generated on the surface of a sphere. The pick up and discharge positions may be located at cusps on the curve where the work piece is instantaneously stopped. In this case, the work piece is picked up slowly and gently, moved rapidly toward the discharge position, and is discharged when the transfer mechanism is stopped. The work piece is smoothly accelerated and decelerated.

Transfer mechanisms of the type which move an article around a segment of a spherical cycloidal curve are disclosed in U.S. Pat. Nos. 2,931,276; 3,100,051; and 3,422,966. In all of these patents, the work piece and work piece holder are rotated as they move along the curve. In U.S. Pat. Nos. 1,958,846; 2,050,119; and 2,415,997 articles are transferred by a turret-type device having radial arms with axially located jaws which hold the article so that the article rotates as it is indexed between positions. Cycloid gear mechanisms per se are discussed at pages 82 through 88 of the June 21, 1965 edition of Product Engineering.

Other objects and features of the invention will become apparent as the description proceeds, especially when taken in conjunction with the accompanying drawings illustrating the invention, of which there are two sheets.

Figure 3:
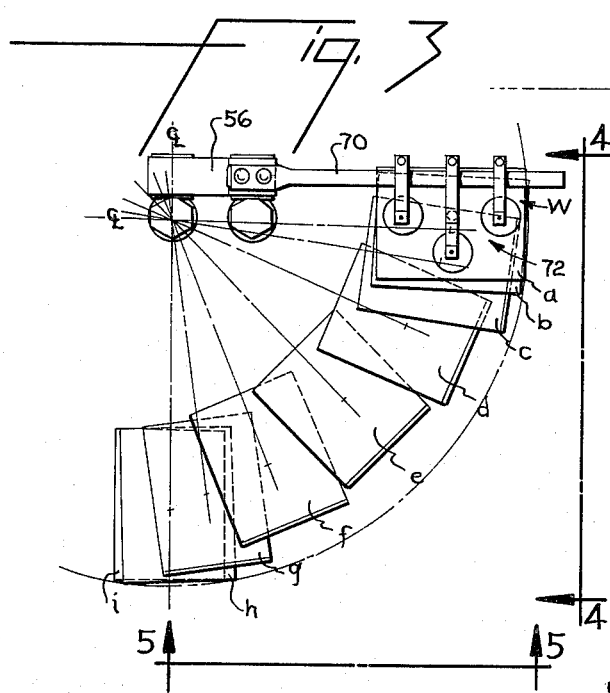
FIG. 3 is a generalized top view of the transfer mechanism shown in FIGS. 1 and 2 also illustrating the path of article movement from a cusp pick up position to a cusp discharge position.
Figure 4:
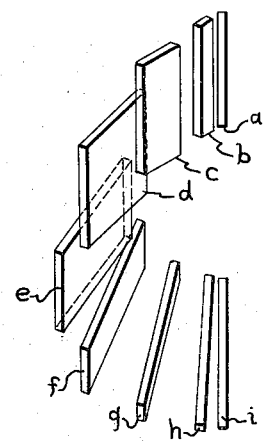
Figure 5:
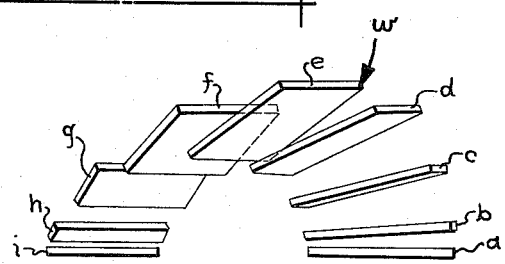

FIGS. 4 and 5 are views illustrating the path of article movement taken along lines 4—4 and 5—5 of FIG. 3, respectively;

FIG. 6 is a side view of a second embodiment of the invention;

FIG. 7 is a top view of the transfer mechanism of FIG. 6;

FIG. 8 is a top view illustrating the path of article movement from a cusp pick up position to a cusp discharge position for the transfer mechanism of FIG. 6; and FIG. 9 is a view of the article movement of FIG. 8 taken in the direction of arrow 9.

Figure 1:
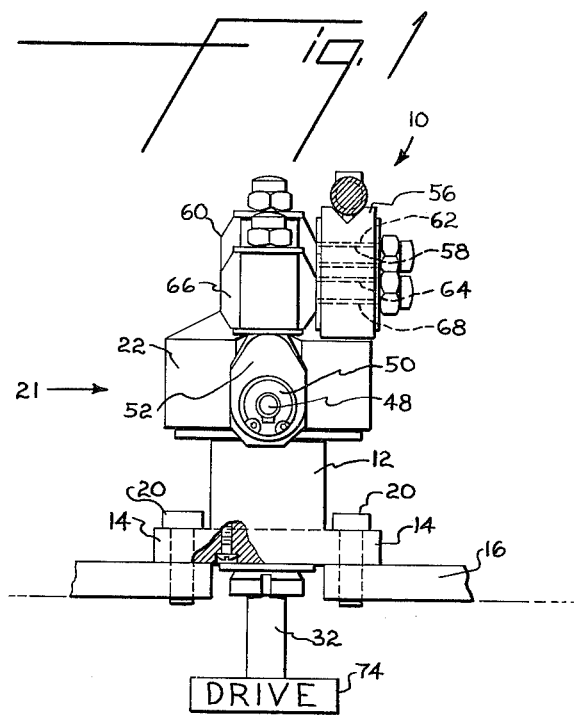
FIG. 1 is a side view of a first embodiment of a transfer mechanism according to the invention.
Figure 2:
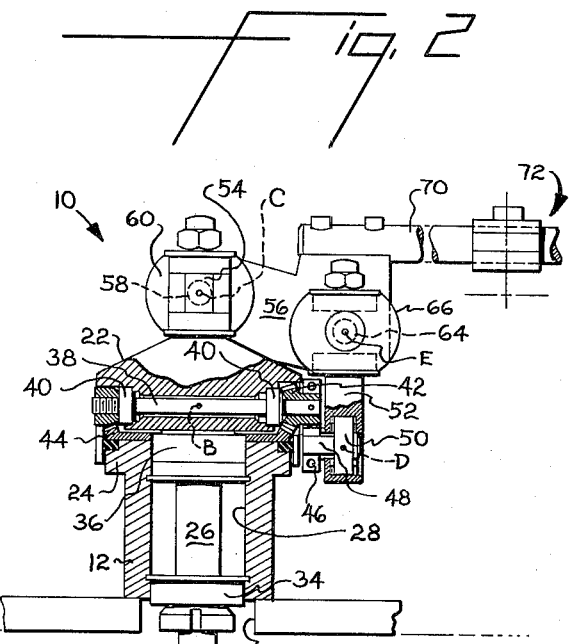
FIG. 2 is a partially broken away view of the transfer mechanism of FIG. 1 taken looking in the direction of arrow 2.

The transfer mechanism 10 of FIGS. 1 and 2 includes a cylindrical base 12 having a pair of opposed flanges 14 at the lower end thereof. The base is mounted on suitable support plate 16 by a pair of bolts 20 extending through the flanges 14. Turret 22 is mounted on the upper end 24 of base 12 and includes a spindle 26 which extends down through the central bore 28 of the base and through opening 30 in support 16 so that the spindle end 32 projects below the support. The spindle is journaled in bearing 34 in the lower part of bore 28 and a bearing 36 in the upper part of the bore.

A shaft 38 is journaled in bearings 40 carried in turret 22 and extends along a diameter of the turret. Pinion gear 42 on one end of the shaft 38 meshes with ring gear 44 secured to the upper end 24 of the base 12. Rotation of the spindle end 32 revolves the turret 22 about the axis of the spindle while shaft 38 rotates as pinion gear 42 tracks in ring gear 44. The ring gear is mounted co-axially with the spindle. The axis of shaft 38 intersects the spindle axis.

Shaft arm 46 is secured to the end of shaft 38 at pinion gear 42 and rotates with the shaft. Throw pin 48 extends from the free end of shaft arm 46 to a bearing 50 in the lower end of link 52. A vertical shaft 54 extends upwardly from turret 22 and is co-axial with spindle 26. Indexing arm support 56 is located to one side of shaft 54 and link arm 52. The support is secured to shaft 54 by means of cross shaft 58, bearing 60 on shaft 54, and bearing 62 in the arm support. Bearing 60 permits rotation of cross shaft 58 circumferentially around shaft 54 and bearing 62 permits circumferential rotation of the indexing arm support around shaft 58. The end of link 52 away from throw pin 48 is secured to indexing arm support 56 by a shaft 65 secured to a vertical bearing 66 on the free end of the link and journaled in bearing 68 carried by the support 56. The various bearings 50, 60, 62, 66, and 68 permit rotation of the pins or shafts journaled therein about the longitudinal axis of the pin or shaft.

An indexing arm 70 is mounted on offset indexing arm support 56 and extends outwardly from the turret. A work piece pick up device 72 is mounted on the outer end of arm 70 for the purpose of engaging a work piece at the pick up position, holding the work piece on the arm during movement of the arm from the pick up position to the discharge position and releasing the work piece at the discharge position. Device 72 may be vacuum actuated.

For purposes of illustration, the work piece may comprise a flat rectangular member W. As shown in FIGS. 3, 4, and 5, the work piece W may be moved from the pick up position *a* through intermediate positions *b, c, d, e, f, g, h,* to the discharge or work position *i*. During the transfer of the work piece from *a* to *i*, every point in the work piece travels along a cycloidal-like curve generated on the surface of a sphere centered at C, at the same time the work piece W is moved 90° around the spindle. The work piece W is positioned in the pick up position *a* on the upper surface of support 16. With the arm 70 positioned as shown in FIG. 3 and the pick up mechanism 72 secured to the work piece, the work piece is first picked up slowly and moved directly away from the support surface. Then, it is moved through a spherical cycloidal-like path toward the position *i* and, upon approaching the position *i*, is moved slowly directly down upon the support surface so that it is gently deposited at position *i* at which time mechanism 72 releases the arm from the work piece. At the pick up and discharge positions, the movement of the arm instantaneously stops. The operation of the transfer mechanism 10 in moving the work piece W from $a$ to $i$ will now be examined in detail.

A suitable drive 74 engages end 32 of spindle 26 to rotate the same back and forth through a given angle necessary to move the indexing arm 70 through a desired indexing path. In the case illustrated, drive 74 rotates spindle 26 back and forth through an angle of 90°. During the 90° movement of turret 22, point D on the axis of throw pin 48 is moved 360° around the axis of shaft 38 and traces a segment of a cycloidal curve upon the surface of a sphere centered at point B, the intersection of the axes of spindle 26 and shaft 38. At the pick up and discharge positions $a$ and $i$, point D is located immediately below the axis of shaft B and lies on a line extending through point B and the mesh point of ring gear 44 and pinion gear 42. When in this position, the circumferential velocity of point D in the direction of rotation of spindle 26 is exactly offset by the retrograde rotational velocity of the point D about the axis of shaft 38 and consequently the motion of point D on the sphere surrounding point B instantaneously stops. The point D is at a cusp on the spherical cycloidal curve.

The mechanical connection between throw pin 48 and support 56, including link 52, shaft 64 and the related bearings, captures the translational motion of point D, without the rotary component of such motion about the axis of pin 48, and transfers the translational motion to the indexing arm support 56 and indexing arm 70. All points movable with the arm 70 move on a path including a cusp.

The support 56 and arm 70 are mounted on the spindle 22 by means of bearings 60 and 62 which form a gimble so that, absent the connection between the support and throw pin 48, each point on the pick up mechanism 72 is free to move on the surface of a sphere having a center at C, a point defined by the intersection of the axes of spindle 26 and shaft 58, despite the fact that the arm 70 is laterally offset to one side of the spindle.

The motion of the pick up mechanism on the surface of a sphere having a center C is limited by the connection to pin 48. This connection transfers the non-rotary motion of point D to all the points on the pick up mechanism so that such points trace cusped paths on the spheres centered at C. Due to the angle at which the arm 70 extends from the turret 22, the cusps of the paths traced by the points on the pick up mechanism lie approximately on the meridian of the spheres while the curved cycloidal-like segments joining the cusps extend up toward the pole. The arm 70 may be positioned as desired on support 56 to position the cusps and the interconnecting cycloidal-like curves where desired.

The work piece positions illustrated in FIGS. 3, 4, and 5 illustrate the movement of the work piece for every 11.25° of rotation of spindle 32. Note that during the movement from the pick up position $a$ to position $b$, the work piece is moved only a slight distance, while the movement from position $d$ to position $e$ is appreciably greater. The drive 74 moves the pick up mechanism 72 to the cusp position of FIG. 3 at which the mechanism is stopped, because point D is at a cusp. The drive 74 may be stopped. This means that the work piece may be picked up without relative movement between mechanism 72, the work piece, or the work piece support. The work piece is slowly lifted directly away from support 16, accelerated and then slowly lowered back to the support and, at the discharge position, is brought into contact with the support at the same time the point D reaches a cusp so that upon discharge the mechanism 72 is motionless. A rapid but smooth transfer is achieved.

Because the rotary component motion of point D is not transferred to the pick up mechanism, the work piece is not rotated about itself during movement from $a$ to $i$. The elimination of such rotation is a desirable feature of the invention and facilitates work piece handling. Also, the work piece is gently lifted perpendicularly away from the support at $a$ and then deposited perpendicularly down upon the support at position $i$, in this way assuring accurate location of the work piece on the support as there is no motion across the support during pick up and discharge while also reducing shocks to the work piece which, in certain situations, could injure the work piece or the support. Accurate work piece location is facilitated.

While the transfer mechanism 10 has been described and illustrated in connection with a 90° cycloid-like transfer path for moving a work piece from $a$ to $i$, cusp points on the path, the transfer path may extend past one or more cusp points and may begin or end at a point other than a cusp point, depending upon the particular requirement of a given job. For instance, spindle 26 could be continuously rotated by drive 74 so that the pick up mechanism 72 would be moved around the base 12 in a closed path having four cusps. A work piece could be picked up and discharged at any given cusp or other point on such path. A work piece could be carried to and past a cusp, for instance, in the case where work is preformed on the part as it is moved to and away from the cusp. Thus, the transfer mechanism 10 has a number of uses in addition to transferring a work piece between two cusp points.

FIGS. 6 through 9 relate to a second embodiment of the invention. Transfer mechanism 80 includes a base 82, turret 84, shaft arm 86 with a throw pin 88 identical to corresponding elements of transfer mechanism 10. The base 82 is mounted on a support surface 89. A drive mechanism 90 rotates the spindle 92 of turret 84 through a desired angle.

A work piece transfer device 92 includes a pair of spaced parallel plates 94 and 96 joined together by three parallel links 98, 100, and 102. The links are equal length and are pivotally mounted on the plates for rotation about parallel axes. Plate 94 includes a bearing on a vertical shaft 104 forming a co-axial extension of spindle 92 so that the transfer device is free to rotate with respect to the turret about the axis of the spindle. A work piece pick up mechanism 106 is secured to plate 96 and upon operation of the transfer mechanism 80 is moved along a cycloid-like cusped curve generated on the surface of a torus.

A drive or control means 108 controls the motion of the device 93 so that the points on the pick up mechanism 106 trace the desired curve on the surface of the torus. Control of drive means 108 includes a ring gear, pinion gear, shaft arm, throw pin, and link 110, all the same as corresponding members in transfer mechanism 10. The upper end of the link 110 includes a shaft 112 rotatably journaled in block 114 which in turn rotates on pin 116 connecting links 100 and 102. In this way, the spherical cycloidal motion traced by point H on the axis of throw pin 88 is captured while removing the rotation of the point about such axis and transferred to the device 92 so that every point on the pick up mechanism 106 moves along a section of a cycloid-like cusped curve generated on the surface of a torus surrounding the axis of shaft 104.

Transfer mechanism 80 may be used to move a work piece X from position $k$ to position $s$ through intermediate positions $l, m, n, o, p, q$, and $r$, as illustrated in FIGS. 8 and 9. The spindle 92 is driven through equal angles as the work piece S is moved between adjacent positions as shown in FIGS. 8 and 9. The work piece is instantaneously stopped at position $k$ and $s$ and accelerates slowly from these positions to a maximum transfer speed at position $o$. This type of transfer has the advantages referred to in connection with the transfer motion of mechanism 10. In this case, however, the work piece is initially moved perpendicularly away from a surface S and, at position $s$ is deposited perpendicularly upon a surface S'.

Both transfer mechanisms 10 and 80 include a work piece pick up device for holding a work piece and a transfer mechanism such that each point on the held work piece is free to move along a particular surface, a sphere in the case of mechanism 10 and a torus in the case of mechanism 80. A control or drive is provided for limiting movement of the pick up mechanism and the work piece held thereby to a particular curve on a surface. The curve may include a cusp.

In other transfer mechanisms it is contemplated that the work piece pick up mechanism may move along a surface other than a sphere or torus and other types of drives or control means may be provided for imparting a particular or cusped motion to the pick up mechanism.

While I have illustrated and described preferred embodiments of my invention, it is understood that these are capable of modifications, and I therefore do not wish to be limited to the precise details set forth, but desire to avail myself of such changes and alterations as fall within the purview of the following claims.

What I claim as my invention is:

1. A transfer mechanism including work piece transfer means for moving a work piece along a surface, said means including holding means for the work piece during motion on said surface; and control means for limiting the movement of said holding means to movement along a curve on the surface having a cusp so that all motion of the holding means is smoothly brought to an instantaneous stop at the cusp.

2. A transfer mechanism as in claim 1 wherein said work piece transfer means includes an arm pivotally secured to a support for universal pivotal movement with respect to the support, said work piece holding means being located on the arm away from the support such that said means pivots about the connection between the arm and the support, said control means comprising means for generating the movement of a point about a cusped cycloidal path and transfer means for capturing the translational motion of such point and transferring it to said arm so that the work piece holding means is moved along a cusped path.

3. A work piece transfer mechanism including a base; a work piece transfer unit mounted on the base for movement with respect to the base, the transfer unit including a work piece pick up device whereby movement of the transfer unit with respect to the base moves the work piece pick up device across a surface; and a control for said transfer unit, said control including means for generating translational and rotational movement of a point along a curve and means for transferring said translational movement only to said transfer unit whereby the motion of the work piece pick up device is limited to movement along a curve on said surface determined by the translational movement of said point.

4. A work piece transfer mechanism as in claim 3 wherein said point moves along a cycloidal curve having a cusp and said work piece pick up device is limited to movement along a curve on said surface including a point at which all motion of the work piece pick up device is brought to an instantaneous stop.

5. A transfer mechanism as in claim 3 including a turret mounted on said base and rotatable about an axis and wherein said control includes a first gear on said base surrounding said axis, a second gear rotatably mounted on said turret and meshed with said first gear, a point moveable with said second gear and located a distance from the axis of such gear, and a link connecting such point to said transfer unit, said link including bearing means for removing all rotary components of motion of said point about itself from the motion transferred to the transfer unit.

6. A transfer mechanism is in claim 5 wherein said first gear comprising a ring gear co-axial with said base axis, said second gear comprising a pinion gear mounted on said turret for rotation about a pinion gear axis perpendicular to said base axis and intersecting such axis, said point being located a radial distance from the axis of said pinion gear such that during each rotation of the pinion gear the point intersects a straight line joining the intersection of said axes and the mesh point between said gears, at which point the motion of the work piece pick up device is instantaneously stopped.

7. A transfer mechanism as in claim 1 wherein said surface is spherical.

8. A transfer mechanism as in claim 1 wherein said curve extends between two cusps and the control means moves the holding means along said curve so that all motion of othe holding means is smoothly brought to an instantaneous stop at each cusp.

* * * * *